United States Patent

Childs et al.

[15] 3,658,685

[45] Apr. 25, 1972

[54] COMBINATION ELECTRODE

[72] Inventors: William V. Childs, Austin, Tex.; Forrest N. Ruehlen, Bartlesville, Okla.

[73] Assignee: Phillips Petroleum Company

[22] Filed: Feb. 9, 1970

[21] Appl. No.: 9,740

Related U.S. Application Data

[60] Division of Ser. No. 683,092, Nov. 2, 1967, Pat. No. 3,511,761, which is a continuation-in-part of Ser. No. 435,268, Feb. 25, 1965, abandoned.

[52] U.S. Cl.............................................204/284, 204/294
[51] Int. Cl..........................................B01r 3/04, C23b 5/74
[58] Field of Search..............204/59, 72, 81, 279, 294, 280, 204/283, 284, 286, 288, 289; 260/671 B; 136/121–122, 120 FC

[56] References Cited

UNITED STATES PATENTS

| 3,017,336 | 1/1962 | Olstowski | 204/284 X |
| 3,393,249 | 7/1968 | Fox et al. | 204/81 |
| 3,298,940 | 1/1967 | Ashley et al. | 204/59 |
| 3,236,759 | 11/1966 | Robinson | 204/286 X |
| 2,358,419 | 9/1944 | Schumacher et al. | 204/294 X |
| 1,613,586 | 1/1927 | Rosendal Dam | 204/294 |

Primary Examiner—John H. Mack
Assistant Examiner—Regan J. Fay
Attorney—Young and Quigg

[57] ABSTRACT

A combination electrode comprising a porous element, e.g., porous carbon, and a metal element in contact with an outer exposed surface of said porous element.

10 Claims, 6 Drawing Figures

Patented April 25, 1972 3,658,685

INVENTORS
W. V. CHILDS
F. N. RUEHLEN
BY
*Young and Quigg*
ATTORNEYS

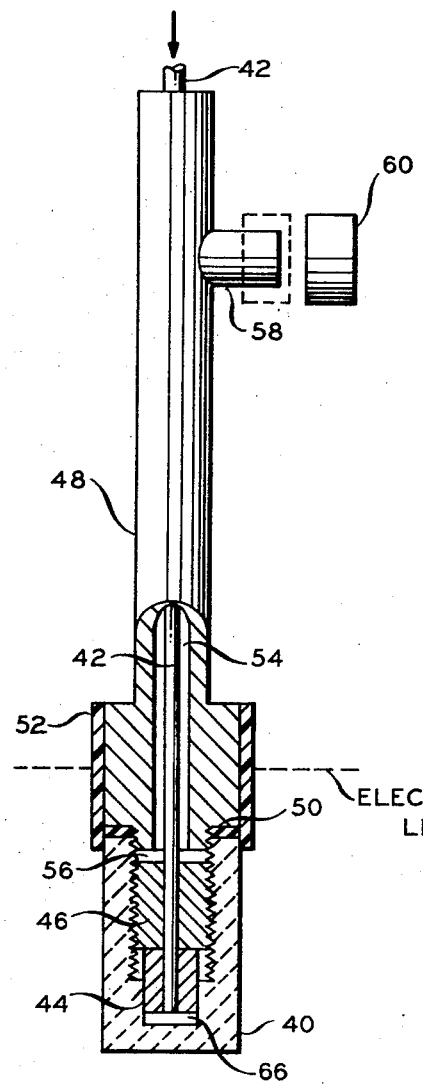
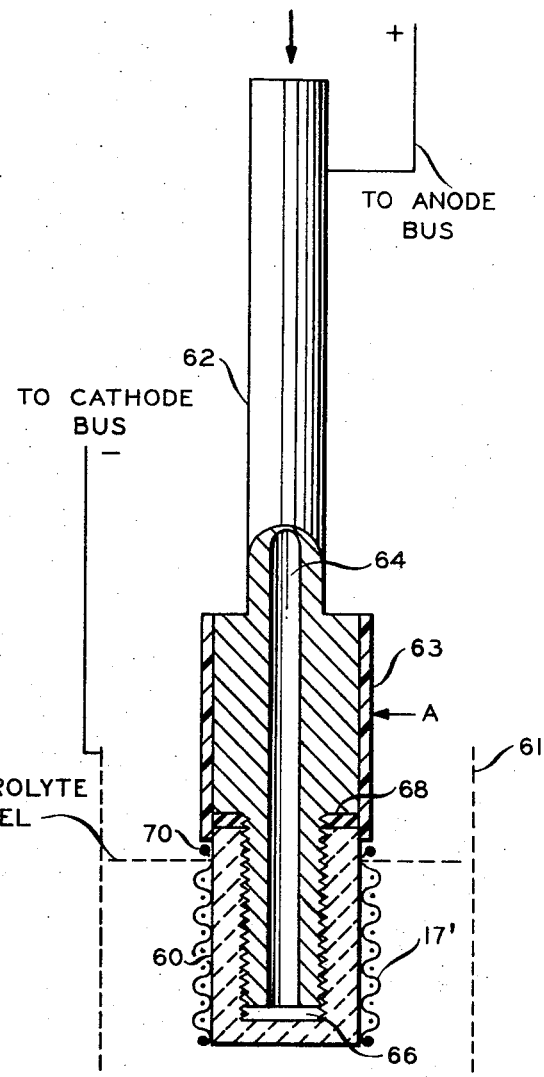
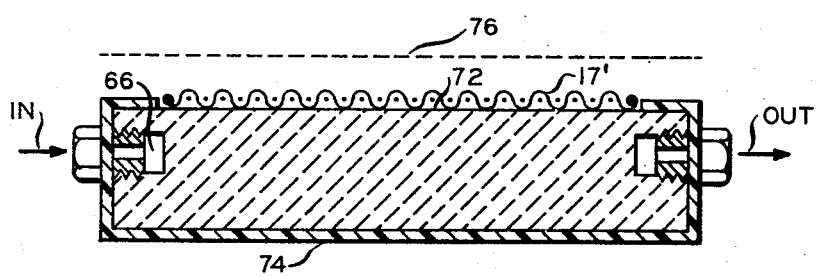
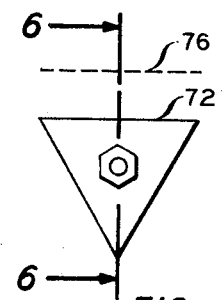

COMBINATION ELECTRODE

This application is a division of our copending application Ser. No. 683,092, filed Nov. 2, 1967, now U.S. Pat. No. 3,511,761. Said copending application was a continuation-in-part of our then copending application Ser. No. 435,268, filed Feb. 25, 1965, now abandoned.

This invention relates to electrochemical fluorination. In one aspect this invention relates to a process for preparing fluorine-containing compounds by electrochemical fluorination of a fluorinatable compound. In another aspect this invention relates to apparatus which can be employed in the electrochemical fluorination of fluorinatable compounds.

Fluorine-containing organic compounds are known to possess value in many fields of industrial chemistry. For example, many of the lower molecular weight compounds are useful as refrigerants, dielectrics, fire extinguishing materials, and as aerosol propellants. Many fluorine-containing compounds are also useful as intermediates for the production of plastics and synthetic elastomers. A number of techniques are known for producing fluorine-containing organic compounds. These include pyrolysis techniques in which fluorine-containing materials are pyrolyzed in the presence of carbon or carbon-containing materials to obtain a mixture of fluorinated compounds. Another technique is to electrolyze a mixture of an electrolyzable fluoride having the compound to be fluorinated dissolved therein. In many instances, a wider commercial application of fluorine-containing organic compounds has been limited due to difficulties in their preparation. Many of the prior art processes for preparing such compounds involve several chemical and mechanical steps and require the utilization of costly starting materials. Furthermore, when employing the methods of the prior art it is difficult to produce moderately or only partially fluorinated products in satisfactory yields. It is even more difficult to produce moderately or partially fluorinated products, e.g., fluorinated hydrocarbons, containing fluorine atoms in certain specific locations in the molecule. It is also difficult to produce fluorinated products electrochemically at high rates of conversion and avoid the formation of substantial amounts of cleavage products.

In copending application Ser. No. 683,089, filed Nov. 2, 1967, now U.S. Pat. No. 3,511,760, by H. M. Fox and F. N. Ruehlen, there is disclosed and claimed a process and apparatus which provides a solution for the above-described difficulties by providing an improved electrochemical process for efficiently and conveniently preparing fluorine-containing compounds. In said process the extent of fluorination of the fluorinatable compound can be readily controlled. Consequently, said process is capable of producing a wide variety of fluorine-containing products with high efficiency and good selectivity. Compared with the fluorination processes of the prior art, the reaction conditions utilized in said process are mild, and the yields of product per kilowatt hour or per unit of anode area are extraordinarily high. Furthermore, as discussed further hereinafter, it has been found that more fluorine can be introduced into a fluorinatable compound per kilowatt hour or per unit of anode area (in the order of at least 100 times as much or more in some instances) than can be accomplished in the processes of the prior art.

Another surprising result or advantage of the invention of said copending application is that the primary products obtained are predominantly partially fluorinated materials. It is difficult to obtain such materials in the methods of the prior art and, as stated above, even more difficult to produce moderately fluorinated hydrocarbons containing fluorine atoms in certain specific locations in the molecule. It is the reactive nature of fluorine to bind itself to a carbon atom to which one or more previous fluorine atoms have already been bound. Thus, any difluoro compounds made by direct fluorination techniques of the prior art almost invariably have both the fluorine atoms attached to the same carbon atom. This has made it necessary to employ indirect methods such as the preparation of appropriate chloro- or hydroxy- analogs followed by replacement of such groups with fluorine. The invention of said copending application provides a direct fluorination process which unexpectedly produces good yields of difluoro compounds in which the two fluorine atoms are not on the same carbon atom. As specific examples, 1,2-difluoroethane and 1,4-difluorobutane can be easily and directly produced in good yields.

In the process of the invention of said copending application a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and therein at least a portion of said organic compound is at least partially fluorinated within the pores of said anode, and fluorinated compound products are recovered from said cell.

The present invention comprises an improvement on the invention of said copending application. We have now discovered that all the above-described advantages of the process of said copending application can be obtained to an unexpected surprisingly greater extent by employing a combination anode comprising porous carbon and a suitable metal, e.g., nickel, in contact therewith, in the electrochemical fluorination process. The high yields of partially fluorinated compounds are especially outstanding when the fluorinatable feedstock is an unsaturated organic compound, for example, an alkene, e.g., ethylene. Furthermore, surprisingly, polarization difficulties are essentially eliminated and the fluorination reaction can be carried out continuously and smoothly at mild conditions for even longer periods of time.

Thus, broadly speaking, our present invention resides in a process comprising electrolyzing a current-conducting essentially anhydrous liquid hydrogen fluoride electrolyte in an electrolytic cell provided with a cathode and a combination anode comprising porous carbon and a suitable metal, e.g., nickel, in contact therewith; introducing a fluorinatable organic compound into the pores of said anode; and recovering fluorinated compound products from said cell.

An object of this invention is to provide an improved electrochemical process for the production of fluorine-containing compounds. Another object of this invention is to provide an improved electrochemical process for the production of fluorine-containing organic compounds in good yields and with good selectivity. Another object of this invention is to provide an improved electrochemical process for the production of fluorine-containing compounds which is economical, commercially feasible, provides for the maximum utilization of the starting fluorinatable material, and is accompanied by the minimum formation of undesirable by-products. Another object of this invention is to provide an improved electrochemical process for the production of fluorine-containing organic compounds which process can be readily controlled to yield products having a desired fluorine content. Still another object of this invention is to provide an improved electrochemical fluorination process for the production of partially fluorinated fluorine-containing compounds, such as difluoro compounds, wherein the two fluorine atoms are attached to different carbon atoms. Another object of the invention is to provide an improved combination anode which can be employed in electrochemical processes. Another object of this invention is to provide an improved apparatus which can be employed in the production of fluorine-containing compounds. Other aspects, objects, and advantages of the invention will be apparent to those skilled in the art in view of this disclosure.

Thus, according to the invention, there is provided a process for the electrochemical fluorination of a fluorinatable organic compound, which process comprises: passing an electric current through a current-conducting essentially anhydrous liquid hydrogen fluoride electrolyte contained in an electrolysis cell provided with a cathode and a combination porous anode comprising a porous carbon element and a metal element in contact with said porous carbon element; passing said organic compound into the pores of said anode; and recovering fluorinated organic compound as product of the process.

Further, according to the invention, there is provided a combination electrode comprising: a porous carbon element; a metal element in contact with said carbon element; and means for holding said metal element in contact with said porous carbon element. Preferably, the metal in said metal element is selected from the group consisting of nickel, iron, cobalt, steel, and alloys of nickel containing at least 5 weight per cent nickel.

Very few organic compounds are resistant to fluorination. Consequently, a wide variety of feed materials, both normally liquid and normally gaseous compounds, can be used in the practice of this invention. Organic compounds which are normally gaseous or which can be introduced in gaseous state into the pores of a porous anode under the conditions employed in the electrolysis cell, and which are capable of reacting with fluorine, are presently preferred as starting materials in the practice of the invention to produce fluorine-containing compounds. However, it is within the scope of the invention to utilize starting materials which are introduced into the pores of the anode in liquid state. Generally speaking, desirable organic starting materials which can be used are those containing from one to eight, preferably one to six, carbon atoms per molecule. However, it is within the scope of the invention to utilize reactants which contain more than six or eight carbon atoms. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. It is also within the scope of the invention to utilize normally gaseous materials such as hydrocarbons containing from one to four carbon atoms as carrier gases. These latter gases will react, but in many instances this will not be objectionable. It is also within the scope of the invention to utilize the above-described carrier gases, and particularly said inert gases, as diluents for the feedstock which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from one to six carbon atoms per molecule. The presently more preferred starting materials are the normally gaseous organic compounds, and particularly said saturated and unsaturated hydrocarbons, containing from one to four carbon atoms per molecule.

Since fluorine is so reactive, no list of practical length could include all starting materials which can be used in the practice of our invention. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexane-2; butadiene; vinyl chloride; 3-fluoropropylene; acetylene; methylacetylene; vinylacetylene; 3,3-dimethylpentyne-2; allyl chloride; methylamine; ethylamine; diethylamine; 2-amino-3-ethylpentane; 3-bromopropylamine; triethylamine; dimethyl ether; diethyl ether; methyl ethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

The electrochemical process of the invention is carried out in a medium of hydrogen fluoride electrolyte. Although said hydrogen fluoride electrolyte can contain small amounts of water, such as up to about 5 weight per cent, it is preferred that said electrolyte be essentially anhydrous. Generally speaking, it is preferred that said electrolyte contain not more than about 0.1 weight per cent water. However, commercial anhydrous liquid hydrogen fluoride which normally contains dissolved water in amounts ranging from a trace (less than 0.1 weight per cent) up to about 1 per cent by weight can be used in the practice of the invention. Thus, as used herein and in the claims, the term "essentially anhydrous liquid hydrogen fluoride," unless otherwise specified, includes liquid hydrogen fluoride which can contain water not exceeding up to about 1 weight per cent. As the electrolysis reaction proceeds, any water contained in the hydrogen fluoride electrolyte is slowly decomposed and said electrolyte concomitantly approaches the anhydrous state. In the practice of the invention, when using one of the more expensive feed materials, one preferred method of operating when starting a cell with a new electrolyte which contains traces of water is to electrolyze and electrolyte for a few hours while using an inexpensive feed material such as methane, prior to introducing the more expensive feed material so as to remove said water. The hydrogen fluoride electrolyte is consumed in the reaction and must be either continuously or intermittently placed in the cell.

Pure anhydrous liquid hydrogen fluoride is nonconductive. The essentially anhydrous liquid hydroden fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulfuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. Such electrolytes can be conveniently prepared by adding the required quantity of hydrogen fluoride to $KF \cdot HF$ (potassium bifluoride). In general, said additives are not consumed in the process and can be used indefinitely. Said additives are frequently referred to as conductivity additives for convenience.

The cell body and the electrodes in the cell must be fabricated of materials which are resistant to the action of the contents of the cell under the reaction conditions. Materials such as steel, iron, nickel, polytetrafluoroethylene (Teflon), carbon, and the like, can be employed for the cell body. The cathode can be fabricated in any suitable shape or design and can be made of any suitable conducting material such as iron, steel, nickel, alloys of said metals, and carbon. The anode must comprise a porous element. Porous carbon, which is economical and readily available in ordinary channels of commerce, is presently preferred for the porous element of said anode. Porous carbon impregnated with a suitable metal such as nickel can also be used as the anode. Various grades of porous carbon can be used in the practice of the invention. It is preferred to employ porous carbon which has been made from carbon produced by pyrolysis, and not graphitic carbon. Two types of commercially available porous carbon are those known commercially as Stackpole 139 and National Carbon Grade 60. Said Stackpole 139 carbon has a pore volume of about 0.2 to about 0.3 cc per gram with the pore diameters ranging from 0.1 to 10 microns in diameter. Said National Carbon Grade 60 has a pore volume of about 0.3 to about 0.5 cc per gram with the pore diameters ranging from 10 to 60 microns in diameter. The actual values of said pore volumes will depend upon the specific method employed for determining same. Thus, preferred porous carbons for fabricating anodes employed in the practice of the invention include those having a pore volume within the range of about 0.2 to about 0.5 cc per gram with the pores ranging from 0.1 to 60 microns in diameter.

In addition to said porous carbon element, said anode must comprise another conducting element which is in contact with said porous carbon element. Said other conducting element can be fabricated from any suitable conducting material which is compatible with the system, e.g., nickel, iron, cobalt, steel (including the various carbon steels and the various stainless steels), and alloys of nickel with other metals which contain at least 5 weight per cent nickel. Included among said alloys of nickel are: alloys of nickel with titanium; alloys of nickel with copper, such as Monel; the various Hastelloys; the various Inconel alloys; and the various Chlorimet alloys. Some of said metals and alloys are more compatible with the system than others are, but all are operable within the scope of the invention. The presently most preferred metals for utilization as said other conducting element are essentially pure nickel, e.g., the various commercially available grades of nickel metal, and the high nickel alloys, e.g., those alloys of nickel containing at least 50 weight per cent nickel.

Said combination anode can be fabricated in any suitable shape or design, but must be arranged or provided with a suitable means for introducing the feed reactant material into the pores of said porous element.

Except for the limitations described above, any commercial cell configuration or electrode arrangement can be employed. The cell must be provided with a vent or vents through which by-product hydrogen can escape and through which volatile cell products can be removed and recovered. If desired or necessary, a drain can be provided on the bottom of the cell for removal of heavier nonvolatile products. The cell can contain an ion permeable membrane or divider, if desired, for dividing the cell into an anode compartment and a cathode compartment. It is frequently preferred to employ such a membrane or divider to prevent hydrogen generated at the cathode from mixing with the volatile fluorinated products produced at the anode. This is done to simplify the purification and isolation of the fluorine-containing products. Any conventionally known resistant membrane or divider material can be employed for this purpose. When the anode products are withdrawn from the cell through a conduit means directly connected to the anode, as described hereinafter, said divider can be omitted.

The electrochemical conversion can be effectively and conveniently carried out over a broad range of temperatures and pressures limited only by the freezing point and the vapor pressure of the electrolyte. Generally speaking, the process of the invention can be carried out at temperatures within the range of from minus 80° to 500° C. at which the vapor pressure of the electrolyte is not excessive, e.g., less than 250 mm Hg. It is preferred to operate at temperatures such that the vapor pressure of the electrolyte is less than about 50 mm Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60° to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process of the invention is conveniently carried out at substantially atmospheric pressure. It should be pointed out that a valuable feature of the invention is that the operating conditions of temperature and pressure within the limitations discussed above are not critical and are essentially independent of the type of feed employed in the process.

An outstanding advantage of the invention is that the process does not depend upon the solubility of the feed material in the electrolyte. Vigorous agitation or the use of chemical solubilizers, such as required in some prior art processes, are not necessary. In some instances, however, a mild stirring or agitation for purposes of aiding in temperature control is beneficial. It should be particularly noted that the porous anode is not merely a sparger for introducing the feedstock into the electrolyte as in some electrolytic processes of the prior art. In the preferred manner of practicing the invention, the fluorination is carried out within the pores of the porous element of the anode and contact between the main body of electrolyte and the feedstock and/or fluorinated products is avoided.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that said anode is not corroded or disintegrated under the given current flow. Current densities within the range of from 30 to 1,000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide in practicing the invention, voltages in the range of 4 to 20 volts per unit cell can be used.

As used herein and in the claims, unless otherwise specified, the term "anode geometric surface" refers to the outer geometric surface area of the porous carbon element of the anode which is exposed to electrolyte and does not include the pore surfaces of said porous element or the surface of the metal element of the anode. For example, in FIG. 1 the anode geometric surface is the vertical cylindrical side wall of the porous carbon element 16.

The feed rate of the fluorinatable material being introduced through the pores of the porous carbon element of the anode is an important process variable in that, for a given current flow or current density, the feed rate controls the degree of conversion. Similarly, for a given feed rate, the amount of current flow or current density can be employed to control the degree of conversion. Feed rates which can be employed in the practice of the invention will usually be within the range of from 0.2 to 50, preferably in the range of from 0.5 to 10, milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). For the anode employed in Examples I to III, and illustrated in FIG. 1, the above ranges would be 10 to 2,550, preferably 25 to 500 milliliters, per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. In the preferred method of practicing the invention, the feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these preferred flow rate conditions there is established a pressure balance between the feedstock entering the pores of the anode from one direction and electrolyte attempting to enter the pores from another and opposing direction. This pressure balance provides an important and distinguishing feature in that essentially none of the feed leaves the anode to form bubbles which escape into the main body of the electrolyte. Essentially all of the feedstock travels within the carbon anode via the pores therein until it reaches a collection zone within the anode from which it is removed via a conduit, or until it exits from the anode, preferably at a point above the surface of the electrolyte.

The more permeable carbons will permit higher flow rates than the less permeable carbons. Any suitable porous carbon which will permit operation within the limits of the above-described pressure balance can be employed in the practice of the above-described preferred method of the invention. Thus, broadly speaking, porous carbons having a permeability within the range of from 0.5 to 75 darcys and average pore diameters within the range of from 1 to 150 microns can be employed in practicing said preferred method of the invention. Generally speaking, carbons having a permeability within the range of from about 2 to about 30 darcys and an average pore diameter within the range of from about 20 to about 75 microns are preferred. It is also within the scope of the invention to employ other porous carbons in practicing other less preferred methods of the invention, as described elsewhere herein.

Similarly, anode shapes, anode dimensions, and manner of disposal of the anode in the electrolyte will also have a bearing on the flow rate. Thus, owing to the many different types of carbon which can be employed and the almost infinite number of combinations of anode shapes, dimensions, and methods of disposal of the anode in the electrolyte, there are no really fixed numerical limits on the flow rates which can be used in the practice of the invention. Broadly speaking, in the above-described preferred method of the invention, the upper limit on the flow rate will be that at which "breakout" of feedstock and/or fluorinated product begins in a region other than within the top portion of the anode when operating with a totally immersed anode similarly as in FIG. 1, or along the immersed portion of the anode when the anode is provided with an internal collection zone as in FIG. 2 or the top of the anode is above the surface of the electrolyte as in FIG. 4. Herein and in the claims, unless otherwise specified, "breakout" is defined as the formation of bubbles of feedstock and/or fluorinated product on the outer immersed surface of the anode with subsequent detachment of said bubbles wherein they pass into the main body of the electrolyte. Broadly speaking, the lower limit of the feed rate in said preferred method of the invention will be determined by the requirement to supply the minimum amount of feedstock sufficient to prevent evolution of free fluorine. As a practical guide to those skilled in the art who desire to practice said preferred method of the invention, the flow rates can be within the range of from 3 to 600, preferably 12 to 240, cc per minute per square centimeter of cross-sectional area (taken perpendicular to the direction of flow).

The above-described pressure balance will permit some invasion of the pores of the anode by the hydrogen fluoride electrolyte. The amount of said invasion will depend upon the inlet pressure of the feedstock and the pore size. The larger size pores are more readily invaded. It has been found that porous carbon anodes as described herein can be successfully operated when up to 40 to 50 per cent of the pores have been invaded by liquid HF electrolyte.

It will be understood that the invention is not limited to the above-described preferred method of operation. It is within the scope of the invention to operate at flow rates which are great enough to cause substantial breakout of the feedstock and/or fluorinated product from within the pores of the anode into the main body of the electrolyte.

The degree of conversion significantly affects the type or identity of the predominating products. Low degrees of conversion favor the production of partially fluorinated products whereas high degrees of conversion produce more highly fluorinated products. An important feature of our invention is that the residence time of the feed materials in the cell is uniform and very low. While the actual residence time of the feed and fluorinated product in the reaction zone of the cell is difficult to determine, it appears the maximum residence time is in the order of 0.01 to 2 minutes, probably less than 1 minute. In the preferred method of the invention the residence time within the pores of the porous element of the anode will be in the range of 0.25 to 0.5 minute. The actual residence time will depend upon the amount of invasion of the anode pores by the electrolyte. This is in marked contrast to the prior art processes wherein the feed material is dissolved in the electrolyte and the resulting solution then electrolyzed over a period of hours. Consequently, controlling the conversion in the process of our invention makes possible a much closer control of the products of the invention as compared to said prior art processes whose "batch type" operation tends to produce excessive quantities of fragmented, completely fluorinated products. Thus, in the practice of the invention when it is desired to utilize a specific feed for the purpose of obtaining a predominantly specific product, or a predominating range of products, a combination porous carbon-metal anode in accordance with the invention is chosen which will be capable of operating at high current densities and thus suitable for passing the required quantity of feed into the pores of the porous carbon element thereof at a rate which will utilize its porosity to maximum advantage.

In the practice of the invention, the feed material and the products obtained therefrom are retained in the cell for a period of time which is generally less than 1 minute. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen can be burned to provide heat energy or can be utilized in hydrogen-consuming processes such as hydrogenation, etc.

It will be noted that in the process of the invention the reactant fluorinatable compound or substance is introduced into the pores of the porous carbon element of the anode and in the preferred method of the invention the fluorination of said reactant is carried out within said pores. While it is not intended to limit the invention by any theory as to its reaction mechanism, it is presently believed the reaction mechanism is basically similar to the postulated reaction mechanism described in said copending application of Fox and Ruehlen. However, it appears there are differences. This is shown by the improved results which are obtained in the practice of the present invention. In said copending application, in describing said postulated reaction mechanism, it is stated: "it is presently believed that fluorine-containing anion from the HF electrolyte migrates into the pores of the porous anode where it discharges an electron and forms a free radical intermediate. It is believed this free radical adsorbs to the surface of the anode pores forming a surface complex which is the actual fluorination species capable of fluorinating said reactant. We have established that free or elemental fluorine is not the fluorinating species. This is shown by the fact that in the normal operation of the process of the invention no free or elemental fluorine can be detected in the cell or in the reaction products.

"Such a system wherein the fluorination takes place within the pores of the anode differs markedly from the systems of the prior art wherein (a) the reactant to be fluorinated is dissolved or emulsified to some extent in the electrolyte, or (b) said reactant is fed through a porous or perforated sparger into the electrolyte. In such prior art systems fluorination occurs in the electrolyte and the solubility of the reactant, usually very low or of only limited solubility at best, has a marked effect upon the reaction and limits the maximum rate of exhaustion or utilization of the fluorinating species or complex and thus limits the amount of current density which can be employed in the process. This limit is not present in the present invention because the reactant feedstock is continually transported to the fluorinating species within the pores of the anode and solubility of the feedstock in the electrolyte is not a controlling factor. This makes possible the utilization of much higher current densities with a resultant great increase in overall efficiency of the process. This increased efficiency is reflected in the unusually high amounts of fluorinated product produced per kilowatt hour, the unusually high amount of fluorine introduced into said product (converted feedstock) per kilowatt hour, and the unusually high amount of fluorine introduced into the product (converted feedstock) per square centimeter of anode surface per hour, as illustrated by the examples given hereinafter. Other outstanding advantages of our process include a marked reduction in carbon chain cleavage and corresponding reduction in the amount of cleavage products, and a preponderance of the more valuable partially fluorinated products."

In the practice of this invention it is presently believed the metal element of the combination porous carbon-metal anode, in some manner not presently known for certain, modifies the above-quoted reaction mechanism to give the improved results of this invention.

It is within the scope of this invention to introduce into the converted feedstock (fluorinated product) an amount of fluorine within the range of from 0.01 to 0.7 gram per square centimeter of anode geometric surface per hour, or more. When operating in accordance with the preferred conditions set forth herein, the amount of fluorine which can be introduced into said converted feedstock is within the range of from 0.02 to 0.4 gram per square centimeter of anode geometric surface per hour. The above amounts of introduced fluorine which can be obtained by the process of the invention are far greater than can be obtained by processes of the prior art.

Stated in terms of electrical power, it is within the scope of this invention to introduce into the converted feedstock (fluorinated product) an amount of fluorine within the range of from 15 to 1,000 grams per kilowatt hour, or more. When operating in accordance with the preferred conditions set forth herein, the amount of fluorine which can be introduced into said converted feedstock is within the range of from 30 to 590 grams per kilowatt hour. The above amounts of introduced fluorine which can be obtained by the process of the invention represent a much greater efficiency in use of electrical power than is obtained by processes of the prior art.

An outstanding advantage of the process of this invention is the essentially complete freedom of the process from polarization difficulties as compared to prior art processes utilizing hydrogen fluoride electrolytes. This contributes to and makes possible the above-described great increase in overall efficiency of the invention process. Polarization is sometimes referred to as the anodic effect. When this happens the ohmic resistance of the cell increases markedly. In severe cases the cell for all practical purposes becomes nonconductive and inoperable. Polarization is aggravated by more than trace amounts of water in the hydrogen fluoride electrolyte. When polarization does occur, rarely, in the operation of our process, we have found the cell can be restored to operation by applying high voltage (about 80 volts) thereto for a short period of time, usually about 2 to 10 minutes. Another way of overcoming polarization is to reverse the current for a short period of time.

In prior art processes utilizing hydrogen fluoride electrolytes and which depend upon the solubility of the reactant feed material in the electrolyte, the maximum amount of current density which can be employed without excessive anode corrosion and product degradation occurring is in the order of 20 milliamps per square centimeter of anode surface. In contrast, in the process of our invention the preferred minimum current density is 50 milliamps per square centimeter of anode surface. In our process, even when employing these high current densities, essentially no cleavage products are produced, even when an unsaturated feed such as ethylene is used.

FIG. 2 is a view in cross section illustrating one form of anode assembly which can be employed in the practice of the invention.

FIG. 4 is a schematic illustration of another cell arrangement and anode assembly which can be employed in the practice of the invention.

FIG. 5 is a schematic illustration of another cell arrangement and anode assembly which can be employed in the practice of the invention.

FIG. 6 is a view in cross section along the line 6—6 of FIG. 5.

Figure 1:
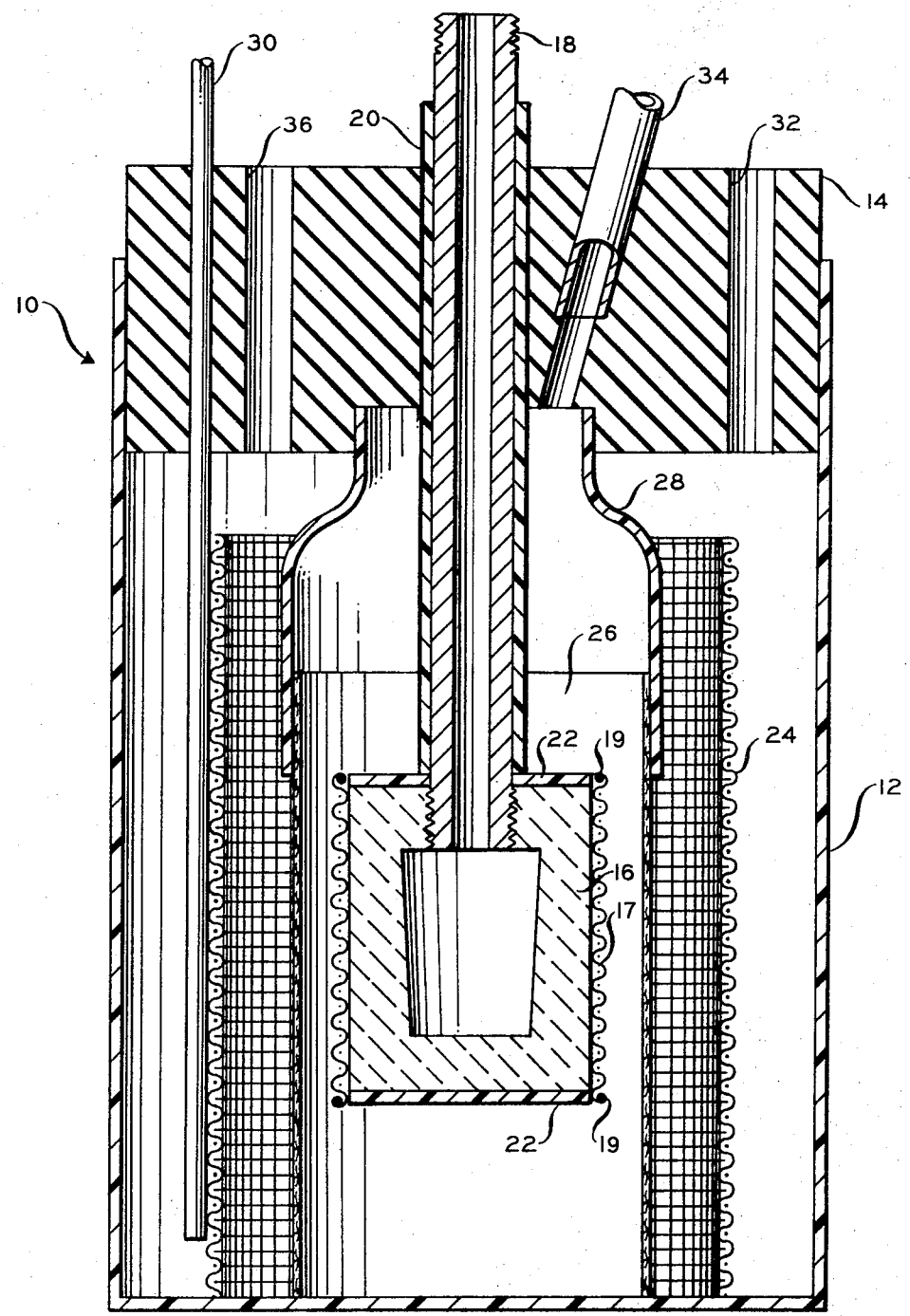
FIG. 1 is a view in cross section illustrating one form of electrolysis cell which can be employed in the practice of the invention.

Referring now to the drawings, the invention will be more fully explained. In FIG. 1, there is illustrated an electrolysis cell designated generally by the reference numeral 10. Said cell comprises a generally cylindrical container 12 which is closed at the bottom and open at the top. Said container can be fabricated from any suitable material which is resistant to the electrolyte employed therein. A removable top closure member 14 is adapted to cooperatively engage the upper portion of said container and close same. As here shown, said closure member comprises a rubber stopper which has been inserted into the upper portion of the container. It will be understood that any other suitable type of closure member which engages the upper edges or upper portion of the container, e.g., a threaded closure member can be employed. A first opening is centrally disposed in and extends through said closure member, as shown. While said opening is here shown as being centrally disposed for convenience, it will be understood it is not essential that said opening be centrally disposed. A first conduit 18, conveniently fabricated from stainless steel, mild steel, or other conductive material, extends through said first opening into the interior of said container 12. A suitable insulation 20, such as Teflon tape, is disposed around the outer wall of said first conduit and between same and the wall of said first opening. A combination anode comprising a hollow cylinder or tube 16 of porous carbon, closed at one end thereof, is connected at the other end to the end of said conduit 18 which extends into said container. Preferably, the top and bottom surfaces of said carbon cylinder are sealed with a suitable plastic or other resistant cement 22. In the cell illustrated in FIG. 1, said carbon cylinder or tube 16 has an outside diameter of about one inch. The remainder of the elements of said cell are, in general, proportional in size. These dimensions are given by way of example only and are not limiting on the invention. Any suitable type of porous carbon from among the several grades commercially available, as described above, can be employed for fabricating the carbon cylinder of said anode.

In addition to said cylinder 16 of porous carbon, said combination anode also comprises a metal member 17, here shown to be in the form of a metal screen or gauze wrapped around the outer side of said cylinder 16 in one or more layers. Said screen or gauze can be made from any of the metals described above, e.g., nickel, high nickel alloys, etc., and can be within the range of 10 to 200, preferably 50 to 150, mesh (U. S. Standard). While a screen or gauze is the presently preferred structure for said metal member, it is within the scope of the invention to employ other structures, e.g., a plurality of metal strips, perforated metal foil, etc.

Said metal member or screen 17 is held in place by tie members 19 which are wrapped around the outside of the screen and hold same tightly in contact with said cylinder 16. Although only two tie members 19 are shown at the top and bottom of the anode, it is within the scope of the invention to employ additional tie members intermediate the ends of said anode. Said tie members 19 can be fabricated from any suitable material such as Teflon (polytetrafluoroethylene) or metal wire of the same composition as said screen 17. It is within the scope of the invention to employ other means for fastening the metal member or screen to carbon cylinder 16. Such other means can comprise any suitable frame, clamps, etc., depending upon the general shape of the anode.

As shown, a recess is provided in the bottom wall of said closure member 14 and surrounds said first opening in said bottom wall. A substantially cylindrical diaphragm holder 28 is positioned with the upper end thereof mounted in said recess and the lower end thereof extending downwardly around said first conduit 18. A substantially cylindrical diaphragm 26 is positioned with its upper end mounted in said diaphragm holder 28 and its lower end extending downwardly around the anode. Said diaphragm can be fabricated from any suitable ion permeable membrane or divider material. As here shown, said diaphragm has been fabricated from an acid-washed filter paper. Other diaphragm materials which can be employed include grids or screens made of various metals such as nickel or nickel alloys, etc. The use of a diaphragm such as diaphragm 26 is not essential in the practice of the invention but is sometimes preferred in that said diaphragm divides the interior of the container into an anode compartment and a cathode compartment. The division of said container into said compartments separates the anode products from the hydrogen produced at the cathode and facilitates the recovery and separation of said anode products. While said diaphragm is shown as extending to the bottom of said container 12, it will be understood there is no connection therebetween and liquid electrolyte is free to flow between said compartments. Also, while not shown, it will be understood that the bottom or bottom portion of said container can be provided with an outlet conduit.

A second opening 34 is provided in and extends through said closure member 14 into communication with said anode compartment. This opening provides means for withdrawing the anode products from the cell. As shown, a conduit has been inserted into said opening. It will be understood that any suitable type of conduit means for withdrawing said anode products can be employed. A tubular thermocouple well 30 extends through said closure member 14 into said cathode compartment. A substantially cylindrical cathode 24, here shown to be fabricated from a metallic mesh or screen, is disposed in said cathode compartment around said diaphragm 26 and is maintained in position by being attached to said thermocouple well 30 (as by silver soldering). Said thermocouple well 30 thus also serves as the means for supporting and for connecting said cathode to a suitable source of direct current. A third opening 36 extends through said closure member 14 into communication with said cathode compartment. Said third opening provides conduit means for removing hydrogen produced at the cathode from the cell. It will be understood that any suitable type of conduit means can be inserted into said opening 36. A fourth opening 32 extends through said closure member 14 into communication with said cathode compartment and comprises conduit means for introducing electrolyte into the cell. It will be understood that any suitable type of conduit means can be inserted in said opening 32. It will also be understood to be within the scope of the invention, as when no diaphragm 26 is employed, to provide the cell with only one opening such as 32, 34, or 36 and to remove all of the cell effluents through said one opening.

In the preferred method of operating the cell illustrated in FIG. 1, said cell is first charged with a suitable electrolyte such as essentially anhydrous liquid hydrogen fluoride and potassium fluoride in a mole ratio of KF·2HF. In the event said electrolyte contains traces of water, it is preferred to first electrolyze the electrolyte by connecting said first conduit 18 and said thermocouple well 30 to a suitable source of direct current and passing said current through the cell for a period of time sufficient to remove essentially all of the water. A fluorinatable organic compound, e.g., a gaseous hydrocarbon, is then passed through conduit 18 into the interior of carbon cylinder 16, and then passed into the interior of carbon cylinder 16, and then passed into the pores of said cylinder into contact with the fluorinating species therein. Fluorination occurs within the pores of said anode. As shown by examples given hereinafter, the unreacted feedstock and fluorinated product move upward through the connecting pores of the porous element of the anode and exit from said anode closely adjacent the top thereof where the hydrostatic pressure of the electrolyte is least. The fluorinated products enter the space above the electrolyte and are withdrawn from the anode compartment via the conduit inserted into opening 34. Hydrogen is withdrawn from the cathode compartment via opening 36. The effluents from the cell will contain some HF, depending upon the temperature at which the cell is operated, and this HF can be removed from said effluents by scrubbing with a suitable scrubbing agent such as Ascarite (sodium hydroxide supported on asbestos), or if recovery of the HF is desired the scrubbing agent can be sodium fluoride or potassium fluoride. In many instances, said HF can be separated from the cell effluents by fractional distillation. Temperature control of the cell contents is maintained by placing the cell in an oil bath provided with heat exchange means.

In the above description, the top of anode 16 has been positioned below the electrolyte level in the cell. If desired, the anode can be raised so that the top portion thereof is above the electrolyte level, and fluorinated product and any remaining unfluorinated feedstock are passed from within the pores of the porous element of the anode directly into the space above the surface of the electrolyte within the cell.

While the cell in FIG. 1 has been illustrated as being substantially cylindrical in shape, any other suitable configuration can be employed. Also, it is within the scope of the invention to employ any other suitable electrolysis cell incorporating the general features of the above-described cell of FIG. 1. It is also within the scope of the invention to employ anodes having a configuration other than cylindrical, e.g., rectangular or triangular, and a disposition within the cell other than vertical, e.g., horizontal.

The anode assembly illustrated in FIG. 2 is described hereinafter in Example IV.

Figure 3:
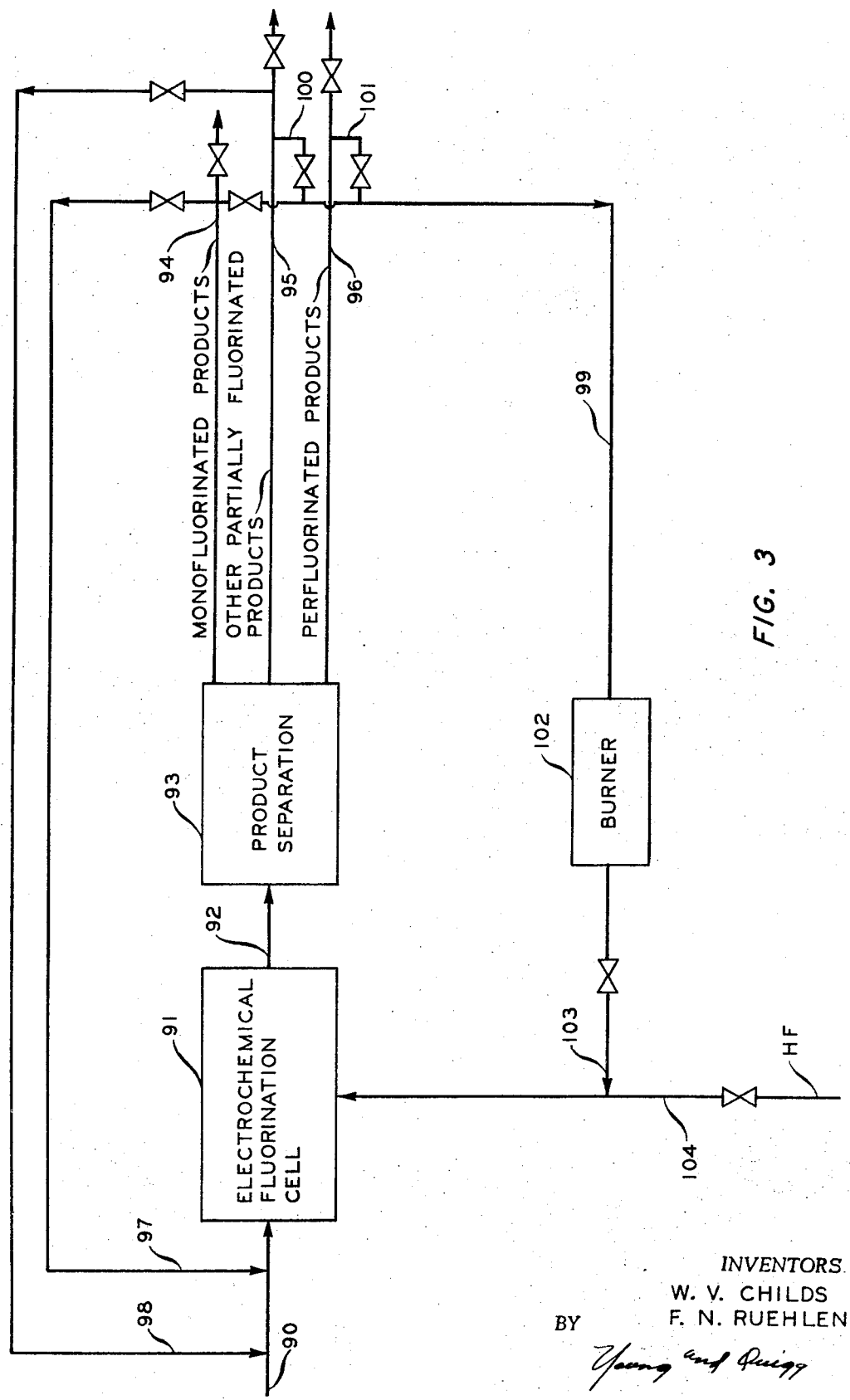
FIG. 3 is a diagrammatic flow sheet illustrating various processing embodiments of the invention.

In the flow sheet of FIG. 3, an organic compound to be fluorinated is introduced via conduit 90 into electrochemical fluorination cell 91. Said cell 91 can be of any suitable type, such as those described in connection with the other drawings. In said cell said organic compound is fluorinated as described herein and cell effluent comprising fluorinated products and unreacted feed material is withdrawn from the cell via conduit 92 and passed into product separation zone 93. Said product separation zone 93 can comprise any suitable means for effecting the desired separation between the products and the unreacted feed material, e.g., fractional distillation, solvent extraction, adsorption means, etc. As discussed herein, the fluorinated products can comprise monofluorinated products, other partially fluorinated products, and perfluorinated products. As used herein and in the claims, unless otherwise specified, the term "perfluorinated" refers to a material wherein all the potential fluorinatable valence bonds have been fluorinated, e.g., hexafluoroethane, $C_2F_6$. Said perfluorinated products can be withdrawn from separation means 93 via conduit 96 as one product of the process. Monofluorinated products can be withdrawn via conduit 94 as a product of the process, or if desired recycled via conduit 97 to conduit 90 for further fluorination in said cell 91. Similarly, the other partially fluorinated products can be withdrawn via conduit 95 as products of the process, or recycled to said cell 91 via conduits 98 and 90. Or, if desired, said partially fluorinated products and said perfluorinated products can be passed via conduits 100 and 101, respectively, into conduit 99, and then into burner and hydrogen fluoride recovery means 102. In said burner 102 said partially fluorinated and said perfluorinated products are burned to recover hydrogen fluoride which can then be passed via conduits 103 and 104 to cell 91. Said burner and HF recovery means can comprise any suitable burner for burning said fluorinated products, and any suitable means for recovering HF from the resulting combustion gases. Make-up hydrogen fluoride, together with any suitable conductivity additive, can be introduced into said cell 91 via conduit 104. Although not shown in the drawing, it will be understood that unreacted feed materials can be withdrawn from said product separation zone 93 and recycled to cell 91 for fluorination.

The anode assembly illustrated in FIG. 4 comprises porous carbon cylinder 60 which is threaded onto the lower portion of anode support and current collector 62 by means of the threads shown. Passageway 64 provides means for introduction of the feedstock to the small space 66 provided at the bottom of the anode. The top of said carbon cylinder 60 is sealed by means of gasket 68. Plastic tape 63 (Teflon) is provided to protect anode support 62. The bottom surface of the anode is preferably coated with a resistant cement to restrict the exposed surface to the vertical portion only. Metal member 17' is provided similarly as in FIG. 1. In use, this anode can be disposed in the electrolyte with an exposed portion 70 above the surface of the electrolyte level as shown in the drawing. When so disposed it is possible to operate the anode in accordance with the preferred method of the invention by maintaining the flow of feedstock within the pores of the anode. In this operation the feedstock enters the pores of the carbon at the bottom of the cylinder, flows vertically via interconnecting pores, and exits from the carbon at 70 directly into the space above the surface of the electrolyte within the cell. The anode assembly can also be disposed so that the entire carbon portion is immersed, e.g., to the point A indicated in the drawing. When so disposed the anode can be operated in a manner, e.g., higher flow rates, to introduce the feedstock into and through the pores of the anode into contact with the main body of the electrolyte in accordance with a less preferred embodiment of the invention, if desired.

The anode assembly and cell arrangement shown schematically in FIGS. 5 and 6 comprises a horizontal anode 72 formed of porous carbon disposed below a cathode 76 formed of an iron wire screen, all in a suitable cell containing an essentially anhydrous liquid hydrogen fluoride electrolyte. Said anode has the general shape of an equilateral triangle. Two sides and the ends of the anode are covered with a resistant cement 74. A metal member 17' is provided in contact with the exposed side of the anode similarly as in FIG. 1. A feedstock inlet and a products outlet are provided in opposite ends of the anode. Suitable electrical connections (not shown) are provided for the cathode and the anode. In one model the anode was 3 inches long and each side had a width of 1 ½ inches. These dimensions are given by way of example only and are not limiting on the invention. If desired, said anode can be rectangular in shape with three sides thereof coated, similarly as for the two sides of the triangular anode. Either said triangular anode or said rectangular anode can be disposed vertically if desired. In operation, the anode and cathode are disposed below the level of the electrolyte. The feedstock can be passed via the inlet conduit into the pores of the anode and products withdrawn therefrom in accordance with the preferred method of the invention. Said inlet conduit and outlet conduit can be employed as means to hold or support the anode in the cell.

The following examples will serve to further illustrate the invention.

EXAMPLE I

A run was carried out for the electrochemical fluorination of ethylene. This run was carried out in a cell having a configuration and operated in the manner essentially the same as illustrated and described above in connection with FIG. 1. The cell container was formed of Teflon FEP (fluorinated ethylene-propylene copolymer). The combination porous carbon-metal anode comprised a hollow cylinder of porous carbon (Stackpole 139 as described above) having a side wall thickness of 0.635 centimeter, and an outside vertical surface area of 30 square centimeters. The bottom and top surfaces of said carbon cylinder were coated with a resistant cement to restrict the exposed geometric surface to the vertical portion only. The side wall (exposed geometric surface) of said carbon cylinder was wrapped about 1.5 times with 100-mesh nickel gauze. The cathode was formed of a nickel screen (8 mesh) and surrounded said combination anode. The electrolyte employed was essentially anhydrous liquid hydrogen fluoride containing potassium fluoride as conductivity additive in the molar ratio of KF·2HF. The current density was 100 milliamps per square centimeter of anode geometric surface. Said run was carried out at a temperature of 76° C. The cell pressure was essentially atmospheric. The feedstock was introduced into the pores of the porous element of the anode at a rate such that the breakout of the unreacted feedstock and/or fluorinated feedstock from within the pores of the anode into the main body of the electrolyte was essentially confined to the top portion of the anode immediately adjacent the top seal 22, i.e., within the upper 0.25 inch of the anode, or less. Another run was carried out under essentially the same conditions except that the nickel gauze wrapping was omitted from the anode.

The cell effluent from each of said runs was analyzed by conventional means such as gas-liquid chromatography and mass spectrography. Other operating conditions and the results of the runs in terms of type and quantity of products obtained are given in Table I below.

TABLE I

| | Run Number | |
|---|---|---|
| | 1 | 2 |
| Anode material | porous carbon | nickel on porous carbon |
| Ethylene feed rate, liters/hr | 4.13 | 4.00 |
| Ethylene feed rate, ml/min/cm² anode[1] | 2.29 | 2.22 |
| Ethylene feed rate, ml/min/cm² anode[2] | 116.8 | 113.2 |
| Ethylene conversion mole % | 12.5 | 13.1 |
| Cell voltage | 7.6 | 6.0 |
| Distribution of Products, mole % | | |
| vinyl fluoride | 6.5 | 10.9 |
| ethyl fluoride | 2.3 | 3.5 |
| 1,1-difluoroethane | 0.5 | 0.6 |
| 1,2-difluoroethane | 22.5 | 27.1 |
| 1,1,2-trifluoroethane | 19.5 | 16.8 |
| 1,1,2,2-tetrafluoroethane | 10.6 | 8.0 |
| 1,1,1,2-tetrafluoroethane | 4.9 | 3.5 |
| pentafluoroethane | 11.7 | 8.0 |
| hexafluoroethane | 8.7 | 5.4 |
| C₃ fluorides | 11.7 | 15.8 |
| C₁ fluorides | 1.1 | 0.4 |
| | 100.0 | 100.0 |

| | | |
|---|---|---|
| Current efficiency to fluorinated products, % | 95 | 93 |
| Grams of fluorine introduced into products | | |
| per cm² of anode[1] per hr. | 0.048 | 0.042 |
| per KWH | 63.2 | 70.0 |
| Gram moles of product/KWH | 1.01 | 1.29 |

(1) geometric surface area
(2) cross-sectional area

The data given in the above Table I show that, at the same degree of conversion, the quantity of mono- and difluoro products obtained from Run No. 2, wherein the combination porous carbon-nickel anode of the invention was employed, was more than 32 per cent greater than the quantity of said products obtained from Run No. 1 wherein the anode employed was porous carbon only.

EXAMPLE II

Another pair of runs was carried out in essentially the same manner and employing essentially the same apparatus as in Example I. In these runs the cell temperature was in the range of 87° to 93°C. The cell pressure was essentially atmospheric. The results of said runs in terms of the type and quantity of products obtained, together with other operation conditions, are set forth in Table II below.

TABLE II

| | Run Number | |
|---|---|---|
| | 1 | 2 |
| Anode material | porous carbon | nickel on porous carbon |
| Ethylene feed rate, liters/hr | 4.20 | 3.84 |
| Ethylene feed rate, ml/min/cm² anode[2] | 2.33 | 2.13 |
| Ethylene feed rate, ml/min/cm² anode[3] | 118.8 | 108.6 |
| Ethylene conversion mole % | 15.3 | 15.1 |
| Current density, ma/sq. cm.[1] | 100 | 67 |
| Product distribution, mole % | | |
| Vinyl fluoride | 4.1 | 11.0 |
| Ethyl fluoride | 1.4 | 3.8 |
| 1,1-difluoroethane | 1.2 | 0.9 |
| 1,2-difluoroethane | 19.0 | 33.6 |
| 1,1,2-trifluoroethane | 18.5 | 15.2 |
| 1,1,2,2-tetrafluoroethane | 10.6 | 4.6 |
| Pentafluoroethane | 11.3 | 2.4 |
| Hexafluoroethane | 5.6 | 1 (approx.) |
| C₄ fluorides | 21.6 | 23.8 |
| C₁ fluorides | 2.3 | 2 (approx.) |
| | 100.0 | 100.0 |

(1) milliamps per cm² of anode geometric surface
(2) geometric surface area
(3) cross-sectional area The data set forth in the above Table II show that, at the same degree of conversion, the quantity of mono- and difluoro products obtained from Run No. 2, wherein the combination porous carbon-nickel anode of the invention was employed, was almost 100 per cent greater than the quantity of said products obtained from Run No. 1 wherein the anode employed was porous carbon only.

EXAMPLE III

In another run acetylene was electrochemically converted to fluorinated products in a cell essentially like that described above for Run No. 1 in Example I. In this run the cell contained essentially the same electrolyte and was operated in essentially the same manner as in Run No. 1 in said Example I. Acetylene was passed into the pores of the porous carbon element of the anode and into contact with the fluorinating species therein at a rate of 3.84 liters per hour. The cell temperature was 88° C. At a cell voltage of about 8.5 volts and a current density of about 133 milliamps per square centimeter of anode geometric surface, the acetylene was smoothly converted to give 1,2-difluoroethylene and 1,1,2,2-tetrafluoroethane as major products. There were essentially no difficulties due to polarization or anodic effect in the operation of the cell.

In another run carried out under substantially the same conditions except that the nickel gauze wrapping was omitted from the anode, the yield of fluorinated products was much less.

EXAMPLE IV

Two series of runs were carried out to demonstrate entry of the feedstock into the pores of a porous anode and the flow of said feedstock within said pores in accordance with the method of the invention.

In these runs an anode assembly essentially like that illustrated in FIG. 2 was employed. Said anode assembly was employed in a cell arrangement substantially like that illustrated in FIG. 1 except that the cell container was provided with a window for observation of the anode. Said anode assembly comprised a porous carbon cylinder 40 having a side wall thickness of about 0.635 centimeter and an outside vertical surface area of 30 square centimeters. The carbon cylinder had an outside diameter of 1 inch and a height of 1.5 inches. A feed tube 42 extended through a metal plug 44 attached to the lower end of said feed tube 42. Said metal plug 44 was sized to have a press fit with the lower inner circumference of said carbon cylinder, as illustrated. In assembly of the anode, said feed tube and metal plug are first inserted into the carbon cylinder. Said carbon cylinder is then threaded onto the reduced diameter portion 46 of the anode support and current collector 48, by means of the threads shown. The upper end of the carbon cylinder 40 fits against gasket or seal material 50. A Teflon tape seal material 52 coats the lower portion of said metal current collector 48. An annular space 54 is provided around said feed tube 42 within said anode support and current collector 48. Anode inner vent 56 extends from the upper inner surface of anode 40 and into communication with said annular space 54. Said inner vent 56 provides a collection zone for unreacted feedstock and fluorinated products exiting from the pores of the anode. Exit vent 58, in communication with said annular space 54 and said inner vent 56, is provided in the upper portion of said anode support and current collector 48 for withdrawing fluorinated feedstock and any remaining unfluorinated feedstock as anode products. Said anode products can thus be collected separately from the cathode products if so desired. Cap 60 is provided for closing said exit vent as indicated by the dotted lines.

In one series of runs the porous carbon anode 40 was made of National Carbon Company Grade 45 carbon (NC-45) having a pore volume of about 0.5 cc per gram with pore diameters ranging from 10 to 100 microns. The average pore diameter was about 58 microns. The anode assembly was positioned in a hydrogen fluoride electrolyte, essentially like that described in the other examples, and immersed to the point indicated by the electrolyte level line in FIG. 2. With cap 60 in place, ethylene feed was started flowing into the anode through feed tube 42 at a rate of 10 liters per hour. The only place bubbles formed was in the top portion of the anode immediately adjacent seal 50, i.e., within the upper 0.25 inch of the anode. This demonstrates that the ethylene had entered the pores of the carbon anode near the bottom thereof and had flowed vertically through the inner connecting pores of the anode without escaping therefrom except at the top as described. The flow rate of ethylene was gradually increased to 60 liters per hour. At 60 liters per hour there was some breakout of feed at points lower than the upper 0.25 inch of the anode but still well within the upper portion of the anode. When the increased flow rate had reached 90 liters per hour, some bubble formation (breakout) was noted toward the bottom portion of the anode. However, it was observed that substantially all of the ethylene continued to flow up through the anode and exit therefrom in the top portion of the anode.

When cap 60 was removed there was no breakout from the surface of the anode, even at the 90 liter per hour flow rate.

In another series of runs the porous carbon anode was fabricated from the above-described Stackpole 139 carbon having a pore volume of about 0.2 to 0.3 cc per gram with the pore diameters ranging from 0.1 to 10 microns. These runs were made with cap 60 removed. Flow of ethylene was started at 2 liters per hour. No bubble formation outside the upper 0.25 inch portion of the anode was observed until the flow rate had reached 40 liters per hour. This run shows that the less permeable Stackpole 139 carbon will not permit as high a flow rate of gas through its pores as will the more permeable NC-45 carbon.

Another series of runs was made using the Stackpole 139 carbon anode with the cap 60 in place closing exit 58. At flow rates of 2 liters per hour essentially all of the breakout or bubble formation on the outer surface of the anode was within the upper 0.25 inch of the anode. At flow rates of 10 liters per hour there was some breakout (bubble formation) outside the upper 0.25 inch portion of the anode, but substantially all of the breakout was still in the upper 0.25 inch portion of the anode. At flow rates of 40 liters per hour the proportion of breakout outside the upper 0.25 inch portion of the anode increased, but the major portion of the gas was still existing from the upper portion of the anode. These runs show that even with the less permeable Stackpole 139 carbon, the feed enters the anode near the bottom and flows up through the connecting pores and escapes from the upper portion of the anode.

As additional examples further illustrating the invention, ethane and 1,1-difluoroethane have been smoothly and efficiently converted to fluorinated products in accordance with the invention. Ethane has been smoothly and efficiently fluorinated with high current efficiencies at temperatures within the range of 90° to 110° C., employing voltages in the range of 7 to 9 volts, and a current density of about 133 milliamps per square centimeter of anode geometric surface to obtain ethyl fluoride, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, and hexafluoroethane as products. The partially fluorinated products predominated. 1,1-difluoroethane has been smoothly and efficiently fluorinated with high current efficiencies at conditions within the range of conditions described in the other examples given herein to obtain products including 1,1,1-difluoroethane, 1,1,2-trifluoroethane, 1,1,2,2-tetrafluoroethane, 1,1,1,2-tetrafluoroethane, and pentafluoroethane.

Herein and in the claims, unless otherwise specified, for convenience the volumetric feed rates have been expressed in terms of gaseous volume calculated at standard conditions, even though the feedstock may be introduced into the anode in liquid state.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A combination electrode, comprising:
   a porous element comprising porous carbon;
   a foraminous metal element in contact with a major portion of an outer exposed surface of said porous element; and
   a conduit means in communication with a chamber formed in said porous element for introducing a reactant feedstock through at least a portion of the wall of said chamber and into the pores of said porous element.
2. An electrode in accordance with claim 1 wherein:
   said porous element is generally cylindrical in shape;
   said metal element surrounds and is in contact with the major portion of the outer wall of said cylinder; and
   said conduit means extends into and together with said wall of said chamber defines said chamber in one end portion of said porous element.
3. An electrode in accordance with claim 1 wherein:
   said porous element is generally triangular in shape;
   said chamber is a first chamber formed in a first end of said porous element;
   said conduit means comprises a first conduit connected to said first end of said porous element;
   a second chamber is formed in a second end of said porous element;
   a second conduit means is connected to said second end of said porous element in communication with said second chamber; and
   said metal element is in contact with the outer exposed surface of at least one side of said triangle.
4. An electrode in accordance with claim 1 wherein said porous element comprises porous carbon impregnated with nickel.
5. An electrode in accordance with claim 1 wherein said metal element comprises a metal selected from the group consisting of nickel, iron, cobalt, carbon steel, stainless steel, and alloys of nickel with other metals which contain at least 5 weight per cent nickel.
6. An electrode in accordance with claim 1 wherein: said porous carbon element has the general shape of a cylinder; said metal element comprises a metal screen surrounding and in contact with the outer wall of said cylinder; and means are provided for holding said metal element in contact with said porous carbon element.
7. An electrode in accordance with claim 1 wherein said porous carbon element comprises a generally rectangular-shaped plate of porous carbon; said metal element comprises a metal screen in contact with an outer exposed surface of said plate; and means are provided for holding said metal element in contact with said porous carbon element.
8. An electrode in accordance with claim 1 wherein said porous carbon element has the general shape of a triangle; said metal element comprises a metal screen in contact with the outer exposed surface of at least one side of said triangle; and means are provided for holding said metal element in contact with said porous carbon element.
9. An electrode in accordance with claim 1 wherein said porous carbon element has a permeability within the range of from 0.5 to 75 darcys and average pore diameters within the range of from 1 to 150 microns.
10. An electrode in accordance with claim 9 wherein said permeability is within the range of from about 2 to about 30 darcys and said average pore diameter is within the range of from about 20 to about 75 microns.

* * * * *